O. O. CURTIS.
AUTOMATIC GEAR SHIFT FOR LATHES.
APPLICATION FILED JULY 18, 1918.
1,293,629.
Patented Feb. 4, 1919.
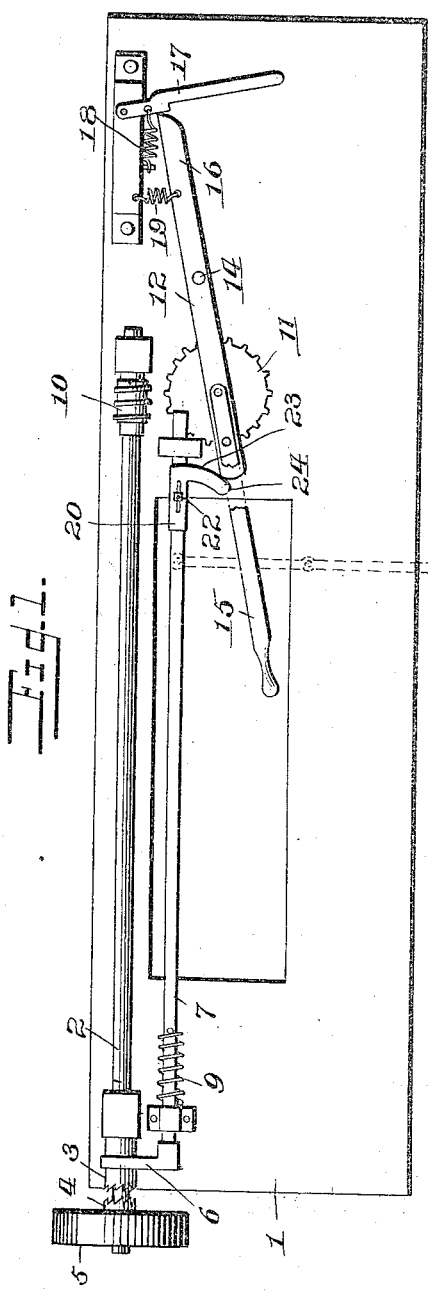
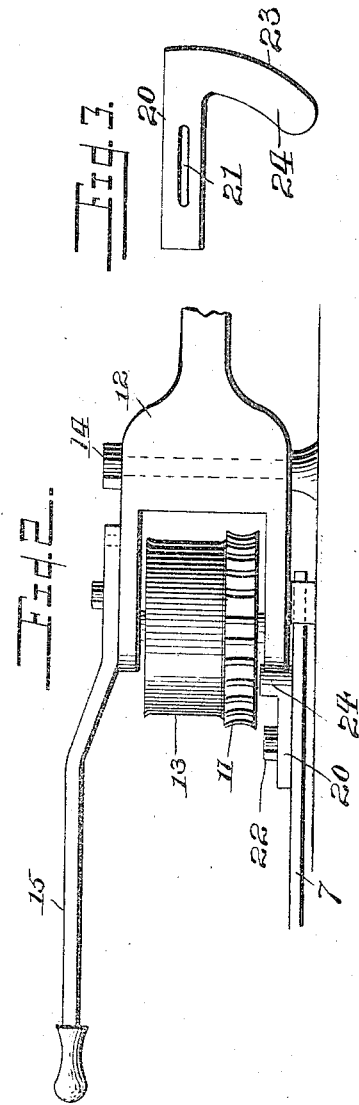
Inventor
Oscar O. Curtis.
by Wilkinson & Giunta
Attys.

UNITED STATES PATENT OFFICE.

OSCAR O. CURTIS, OF FORT MADISON, IOWA, ASSIGNOR TO CURTIS BROTHERS HANDLE COMPANY, OF FORT MADISON, IOWA, A CORPORATION OF SOUTH DAKOTA.

AUTOMATIC GEAR-SHIFT FOR LATHES.

1,293,629.  Specification of Letters Patent.  Patented Feb. 4, 1919.

Application filed July 18, 1918. Serial No. 245,524.

*To all whom it may concern:*

Be it known that I, OSCAR O. CURTIS, a citizen of the United States, residing at Fort Madison, in the county of Lee and State of Iowa, have invented certain new and useful Improvements in Automatic Gear-Shifts for Lathes; and I do hereby declare the following to be a full, clear, and exact description of the invention, such as will enable others skilled in the art to which it appertains to make and use the same.

The present invention relates to improvements in automatic gear shifts for lathes, and it is more specifically my purpose to provide means whereby the lathe clutch may be engaged at the same time and by the same operation that is employed to bring the gears into mesh that drive the carriage-operating device.

In the accompanying drawings forming a part of this application, and in which similar reference symbols indicate corresponding parts in the several views:

Figure 1 shows a top view of a lathe, with certain parts removed, and showing one form of a gear shift device constructed in accordance with the present invention.

Fig. 2 is an enlarged fragmentary elevational view of a detail; and

Fig. 3 is an enlarged plan view of the improved gear shift device.

Referring more particularly to the drawings, in which I have illustrated the improved device in connection with a Klotz irregular ax handle lathe, 1 designates a portion of the framework of the lathe carrying the drive shaft 2 which is provided in the usual manner with the sliding clutch collar 3 adapted to engage the complementary clutch part 4 movable with the continuously driven pulley 5. The pulley 5 is driven in the customary manner by a belt (not shown) from a suitable source of power, and the same revolves freely without rotating the shaft 2 when the clutch parts are disengaged as they are shown in Fig. 1.

The clutch collar 3 is shifted axially along the shaft 2 by an arm 6 which is carried on one end of a reciprocating shifting bar 7. As now built the shifting bar is connected to a lever, shown in dotted lines at 8, and such lever 8 is independently movable to shift the bar 7 in either direction accordingly as it is desired to engage or disengage the clutch 3, 4. I dispense with this lever 8 and the necessity for any separate and independent operation of the shifting bar 7, all as will be hereinafter more fully explained.

A coil spring 9 is a convenient means for yieldingly urging the shifting bar 7 to the right so that the clutch collar 3 may be automatically disengaged; although a weight or any other appropriate device may be employed to get a like result.

A worm 10 is made fast on the drive shaft 2, and is adapted to be driven thereby when the shaft is put in motion. A worm wheel 11, carried by the usual hanger 12, is adapted to be engaged with the worm 10 when said hanger is moved in one direction and when the two gear elements 10 and 11 are brought into mesh the necessary rotary movement may be imparted to the cord spool 13. This spool 13 receives the cord and operates to draw the carriage across the machine in the usual manner.

The hanger 12 oscillates on a pivot 14 and is actuated by a lever or handle 15. The tail end 16 of the hanger is arranged to be engaged by a catch 17 drawn yieldingly to the left by a coil spring 18. A coil spring 19 is also employed to draw back the tail end 16 of the hanger 12 when the catch 17 is withdrawn, so that the gear elements 10 and 11 are automatically released. The catch 17 is automatically operated in the usual manner, but as the parts affecting this operation do not concern the present invention the same have not been illustrated.

All of the foregoing parts are found in the Klotz lathe as now manufactured, and operate in the same way. In the operation of this Klotz lathe it is necessary to operate independently both the lever 8 and handle 15 before the carriage can be set in motion. In other words, it is necessary to swing the handle 15 and hanger 12 in order to bring the gears 10 and 11 into mesh before or after which it is also necessary to swing the lever 8 to the right for the purpose of shifting the bar 7 to bring the teeth of the clutch collar 3 into engagement with the clutch teeth 4.

It is the purpose of the present invention to provide means whereby these operations may be carried out simultaneously and by the shifting of the handle 15 alone without reference to the lever 8, which is accordingly dispensed with. This I accomplish by the provision of a device carried on the shifting bar 7 and adapted to be engaged by the hanger 12, or some other movable part, with the result that the bar 7 is shifted to the left when the hanger 12 is moved to bring the worm wheel 11 into mesh with the worm 10. This device preferably takes the form shown in the present drawings, wherein 20 indicates the shank of the device, the same being provided with an elongated slot 21 through which a fastening means 22 is adapted to pass for securing the device to the shifting bar 7. The slot permits of adjustment so that the gear shift device may be placed in a desired position with respect to the hanger 12.

The device is further provided with an angular projection 24 preferably curved and having a curved or cam face 23. The shoe is so disposed with reference to the hanger 12 that one forward edge of the latter is adapted to ride into contact with the face 23 when accomplishing the movement which brings the gears into mesh; and by reason of the curvature given the face 23, such hanger will be caused to shift the bar 7 to the left, thus effecting the engagement of the clutch and the rotation of the shaft 2.

When the gears are engaged the catch 17 will slip over the tail 16 and hold these parts in the shifted position until the carriage arrives at the end of its movement, at which time the catch 17 will be automatically displaced and the spring 19 allowed to oscillate the hanger 12 to remove the gears 10 and 11 from engagement. Such action will also operate to move the hanger backward across the cam face 23 of the gear shift device and permit the spring 9 to return the shifting bar 7 and clutch collar 3 to the disengaged position shown in Fig. 1.

The gear shift device is readily applied to existing lathes by the simple alteration necessary to receive the fastening means 22, after which a single operation only is required to put the lathe into operation. The gear shift device has been put into actual operation and has been found to give good results in saving time and labor and increasing the capacity of the machines.

It is obvious that those skilled in the art may vary the details of construction and arrangement of parts without departing from the spirit of my invention, and therefore I do not wish to be limited to such features except as may be required by the claims.

I claim:

1. In combination with a lathe having a carriage-actuating device, a shaft, means for driving said shaft, a clutch adapted to connect said shaft and said shaft-driving means, means for yieldingly tending to disengage said clutch, a shifting bar connected to said clutch for engaging the same, a movable hanger, a gear element carried by said movable hanger and in operative relation to the carriage-driving device, a second gear element on said shaft adapted to be engaged by the first named gear element when the hanger is moved in one direction, means carried by said shifting bar and arranged to be engaged by said hanger whereby to engage the clutch when said gear elements are brought into mesh, a catch for holding said hanger in position with the gear elements engaged, and means for moving the hanger to disengage said gear elements when the catch is removed, substantially as described.

2. In a lathe, a shaft, means for driving said shaft, a clutch arranged to connect said shaft and shaft-operating means, a gear element on said shaft, a second gear element adapted to be brought into engagement with the first named element, a movable hanger carrying said second named gear element, a carriage-driving device adapted to be operated from said second named gear element, a shifting bar connected to said clutch, and means arranged between said hanger and shifting bar whereby the latter may be moved to engage the clutch when the hanger is shifted to engage the gear elements, substantially as described.

3. In a lathe, the combination of a hanger, a cord spool carried by and movable with said hanger, a worm wheel also carried by said hanger for rotating said cord spool, a worm adapted to drive said worm wheel when the hanger is raised to bring the latter into mesh therewith, a shaft for rotating said worm, continuously driven means for rotating said shaft, a clutch adapted to connect said shaft and said last named means, a shifting bar connected to actuate said clutch, and a shoe carried by said shifting bar and arranged to be encountered by said hanger whereby to move said shifting bar and engage said clutch when the worm wheel is brought into mesh with said worm, substantially as described.

4. In a lathe, the combination of a hanger, a cord spool carried by and movable with said hanger, a worm wheel also carried by said hanger for rotating said cord spool, a worm adapted to drive said worm wheel when the hanger is raised to bring the latter into mesh therewith, a shaft for rotating said worm, continuously driven means for rotating said shaft, a clutch adapted to connect said shaft and said last named means, a shifting bar connected to actuate said clutch, a shoe carried by said shifting bar and arranged to be encountered by said hanger whereby to move said shifting bar and engage said clutch when the worm wheel is brought into mesh with said worm, and means for shifting said bar to disengage said clutch when said hanger is moved to withdraw the worm wheel from mesh with said worm, substantially as described.

5. In a lathe, a carriage-operating device, disengageable means for driving said carriage-operating device, a shaft for driving said disengageable means, shaft-rotating means, a clutch arranged between said shaft and shaft-rotating means, a shifting bar connected to said clutch, means for constantly tending to disengage said clutch, and a shoe having a cam face adjustably held on said shifting bar and adapted to be engaged by a moving part when said disengageable means are connected whereby the clutch may be engaged, substantially as described.

6. In a lathe, a carriage-operating device, disengageable means for driving said carriage-operating device, a shaft for driving said disengageable means, a shaft-rotating means, a clutch arranged between said shaft and shaft-rotating means, a shifting bar connected to said clutch, means for constantly tending to disengage said clutch, and a shoe formed with an angular projection having a curved face, said shoe being formed to receive means whereby the same may be adjustably held on said shifting bar, and a part adapted to ride over the curved face of the shoe projection when the disengageable means are brought together whereby said bar may be shifted and the clutch engaged, substantially as described.

7. In a lathe, a carriage-operating device, disengageable means for driving said carriage-operating device, a shaft for driving said disengageable means, shaft-rotating means, a clutch arranged between said shaft and shaft-rotating means, a shifting bar connected to said clutch, means for constantly tending to disengage said clutch, and a shoe formed with a slotted shank to adjustably receive fastening means for connecting same to said shifting bar, said shoe having a curved angular projection extending from said shank, and a part adapted to ride into contact with said curved face when the disengageable means are brought together whereby to move the shifting bar and engage the clutch, substantially as described.

In testimony whereof, I affix my signature.

OSCAR O. CURTIS.

Copies of this patent may be obtained for five cents each, by addressing the "Commissioner of Patents, Washington, D. C."